United States Patent Office 3,085,852
Patented Apr. 16, 1963

3,085,852
SEPARATION OF LITHIUM ISOTOPES
Kurt Peters, Getreidemarkt 9, Vienna VI, Austria
No Drawing. Filed Apr. 23, 1957, Ser. No. 654,446
9 Claims. (Cl. 23—32)

This invention relates to a chemical process for separating lithium isotopes.

The occurrence in nature of the lithium isotopes which have atomic weights of 6 and 7 is generally in the ratio of about 1 to 12.5, respectively. Analyses of various lithium-bearing minerals are shown in Table I.

Table I

| Mineral: | Ratio of $Li^7$ to $Li^6$ |
|---|---|
| Spodumen | $12.54 \pm 0.03$ |
| Lepidolit | $12.57 \pm 0.40$ |
| Amblygonit | $12.51 \pm 0.20$ |
| Amblygonit | $12.47 \pm 0.20$ |
| Triphylit | $12.91 \pm 0.02$ |

Attempts to separate these isotopes by chemical means has not been found to be economically feasible on an industrial scale of operation. For example, by fractionally precipitating the lithium isotopes fourteen times, the ratio of lithium 7 to lithium 6 was increased from 12.5 to 1 up to 14.6 to 1.

It is an object of this invention to provide an improved process for chemically separating the isotopes of lithium.

Other objects will be apparent from the subsequent disclosure and appended claims.

The objects are achieved by the discovery that lithium isotopes may be separated by fractional precipitation from a solution wherein the lithium isotopes are present as specific complex ions. The complexions which satisfy the requirements of the present invention comprise, in addition to cations of lithium, at least one cation of at least one metal selected from the group consisting of aluminum, chromium, molybdenum, tungsten, uranium, vanadium, columbium, and tantalum, and at least one radical of at least one polybasic organic acid; each individual cation contains only one isotopic species of lithium.

The preferred radicals of polybasic organic acids are those of oxalic acid, citric acid and tartaric acid. Best results are obtained by employing solutions of aluminum salts of these acids to complex the lithium isotopes.

The complex ions of lithium may be formed by treating lithium salts with an appropriate metal salt of a polybasic organic acid such as aluminum oxalic acid or by treating lithium salts of polybasic organic acids with solutions containing aluminum ions such as a solution of aluminum nitrate.

The separation of the complex ions according to the isotopes contained therein is effected by carefully controlled fractional precipitation from a substantially homogeneous environment. The techniques commonly employed to effect good crystal growth from solution are advantageously applied to the separation of this invention.

Thus, since the interchange of material between the crystal nucleus and the solution occurs by diffusion through a static film of solution lean in the least soluble component, time is required to permit adequate diffusion and to avoid the drawing of material from the interface film. A more gradual precipitation provides a substantially uniform and improved enrichment for any one step. Similarly, agitation reduces the thickness of the interface film thereby reducing the time necessary for diffusion of material between the solution and the crystal nucleus. Throughout the treatment of the solution, the main consideration is to maintain a homogeneous solution. Gradations of concentration, pH, temperature, etc., should be minimized within the system. In addition to agitation of the solution, the addition of reagents in spray or aerosol form is preferred to addition of the reagents in large drops. Slow addition of the reagents in small amounts is also beneficial.

The precipitation treatment should be stopped prior to the appearance of visible turbidity for good separation. At the point where visible turbidity appears, the diameter of the particles is of the order of $10^{-5}$ centimeters, and the particles consist of several thousand molecular layers; decisive defects in the particles may have already occurred. Precipitation is preferably effected as close to the threshold point as possible. By "threshold point" is meant that point at which a slight change of any process variable in a direction favoring precipitation causes precipitation to occur.

One method which may be employed to effect precipitation, at, or near, the threshold point is to adjust the process variables of the system to values which exceed the values at the threshold point, as shown by the beginning of visible turbidity, or by the Tyndall effect; the variables are then readjusted so as to just redissolve the crystal nuclei, followed by a reversal of the system by very slight, incremental changes in the variables whereby precipitation is effected.

By "a value exceeding the threshold value" is meant merely that the value is such that precipitation will occur, and not that the value is numerically greater than the threshold value. Thus, for a solution of a salt which decreases in solubility with decreasing temperature, the threshold value of temperature is the temperature at saturation; a value of temperature exceeding the threshold value is a temperature lower than the saturation temperature.

As a further illustration of the preferred precipitating technique, a precipitating agent may be added until turbidity is observed. By raising the temperature slightly, the crystal nuclei may be redissolved. Subsequent seeding of the solution with crystal nuclei of the least soluble of the salts to be precipitated with very gradual cooling of the solution causes precipitation at, or near, the threshold points.

In order to save time during treatment, the environmental conditions such as pH, temperature, etc., may be changed rapidly up to the threshold point provided the values at the threshold point are not exceeded; subsequent changes should then be in small increments as discussed previously.

Failure to maintain homogeneous conditions and to alter the environmental conditions in small increments may give rise to an incomplete separation and a contaminated product since the values of the variables at the threshold point of each of the metals to be separated may differ by only minor amounts, e.g., only a few hundredths of one pH unit.

In approaching the threshold point during separation by crystallization or precipitation when continuous and vigorous agitation of the reaction mixture are employed, the most advantageous rates of change of the environmental conditions are shown in Table II.

Table II

| Variables: | Preferred maximum rate of change |
|---|---|
| Temperature | 0.1° C. per minute. |
| pH | 0.1 pH unit per hour. |
| Concentration of ions | 1 relative percent per hour. |

The precipitating reagents which are particularly suited for the present invention are ammonium carbonate and ammonium phosphate. However, other precipitating reagents, such as dilute carbonate solutions, may also be employed.

As an example of the present invention, 10 grams of lithium carbonate were treated with 100 cubic centimeters of a 1.6 molar Al oxalic acid solution. Carbon dioxide was evolved from the solution. The solution was permitted to stand until it formed a honey-like mass which solidified to a crystal slurry, and finally to a crystal cake. At this point the material was fully matured. The crystal cake was dissolved in water to provide a 10 percent solution having a pH value of 4. To 100 cubic centimeters of this solution was added, at 70° C., a 10 percent solution of ammonium carbonate. The carbonate solution was added, with stirring, at a rate of about 1 cubic centimeter per hour until a slight turbidity appeared. The addition was stopped at this point but the stirring was continued, and the temperature was held constant, for several hours. The precipitate was filtered and washed with a one percent solution of aluminum nitrate. Additional fractions were obtained in the same manner. The isotopic composition of the fractions is shown in Table III.

*Table III*

| | Ratio of $Li^7$ to $Li^6$ |
|---|---|
| Starting material | 12.48 |
| Fraction 1 | 26.80 |
| Fraction 2 | 16.50 |
| Fraction 3 | 15.30 |
| Fraction 4 | 12.88 |
| Fraction 5 | 9.78 |
| Fraction 6 | 6.72 |

In a second example, the lithium was complexed in the same manner except that aluminum citric acid was substituted for aluminum oxalic acid. The fraction precipitation was effected by the addition of an ammonium phosphate solution which was adjusted to a pH of 8. The conditions for a homogeneous environment were maintained throughout the precipitation. The isotopic concentration in the several fractions is shown in Table IV.

*Table IV*

| | Ratio of $Li^7:Li^6$ |
|---|---|
| Starting material | 12.48 |
| Fraction 1 | 34.71 |
| Fraction 2 | 6.31 |
| Fraction 3 | 5.11 |
| Fraction 4 | 5.07 |
| Fraction 5 | 2.63 |

What is claimed is:
1. In the fractional precipitation of lithium values from an aqueous solution of a lithium-bearing material containing at least two of the isotopic lithium species to produce a plurality of fractions wherein the first of said fractions is more concentrated, and the last of said fractions is less concentrated, in the heavier of said isotopic species than the initial lithium-bearing material from which said aqueous solution was prepared, the improvement which comprises effecting the solution of the lithium values as complex ions in an aqueous medium, each of said complex ions comprising at least one cation of a single isotopic species of lithium, at least one aluminum cation, and at least one radical of at least one polybasic organic acid selected from the group consisting of oxalic acid, citric acid, and tartaric acid, and fractionally precipitating the lithium values from solution.

2. A process in accordance with claim 1 wherein the fractional precipitation is effected in a substantially homogeneous environment, and wherein the precipitating reagent is a solution of a salt selected from the group consisting of ammonium carbonate and ammonium phosphate.

3. In the fractional precipitation of lithium values from an aqueous solution of a lithium-bearing material containing at least two of the isotopic lithium species to produce a plurality of fractions wherein the first of said fractions is more concentrated, and the last of said fractions is less concentrated, in the heavier of said isotopic species than the initial lithium-bearing material from which said aqueous solution was prepared, the improvement which comprises effecting the solution of the lithium values as complex ions by intimately contacting said lithium-bearing materials in an aqueous medium with a source of aluminum cations and at least one radical of at least one polybasic organic acid selected from the group consisting of oxalic acid, citric acid, and tartaric acid, and fractionally precipitating the lithium values from solution.

4. A process in accordance with claim 3 wherein the fractional precipitation is effected in a substantially homogeneous environment, and wherein the precipitating reagent is a solution of a salt selected from the group consisting of ammonium carbonate and ammonium phosphate.

5. In the fractional precipitation of lithium values from an aqueous solution of a lithium-bearing material containing at least two of the isotopic lithium species to produce a plurality of fractions wherein the first of said fractions is more concentrated, and the last of said fractions is less concentrated, in the heavier of said isotopic species than the initial lithium-bearing material from which said aqueous solution was prepared, the improvement which comprises treating the said lithium-bearing materials with a solution of at least one aluminum salt selected from the group consisting of aluminum oxalic acid, aluminum citric acid, and aluminum tartaric acid, thereby effecting the solution of the lithium values as complex ions; establishing homogeneous conditions throughout the complex ion-containing solution; fractionally precipitating lithium values from said substantially homogeneous solution; and maintaining substantially homogeneous conditions throughout said fractional precipitation.

6. In the fractional precipitation of lithium values from an aqueous solution of a lithium-bearing material containing at least two of the isotopic lithium species to produce a plurality of fractions wherein the first of said fractions is more concentrated, and the last of said fractions is less concentrated, in the heavier of said isotopic species than the initial lithium-bearing material from which said aqueous solution was prepared, the improvement which comprises effecting the solution of the lithium values as complex ions in an aqueous medium, each of said complex ions comprising at least one cation of a single isotopic species of lithium, at least one cation of aluminum, and at least one radical of at least one water-soluble aliphatic polybasic organic acid selected from the group consisting of oxalic acid, citric acid, and tartaric acid, establishing homogeneous conditions throughout the complex ion-containing solution, fractionally precipitating said lithium values from said substantially homogeneous solution while maintaining substantially homogeneous conditions throughout said fractional precipitation by maintaining a maximum rate of change of environmental conditions of 0.1° C. per minute for temperature, 0.1 pH unit per hour for pH, and 1 relative percent per hour for ion concentration.

7. A process in accordance with claim 6 wherein a salt selected from the group consisting of ammonium carbonate and ammonium phosphate is employed as the fractional precipitating agent.

8. A process for separating lithium isotopes from lithium-bearing materials which comprises treating the said lithium-bearing materials with a solution of at least one aluminum salt selected from the group consisting of aluminum oxalic acid, aluminum citric acid, and aluminum tartaric acid, thereby effecting the solution of the lithium values as complex ions; establishing homogeneous conditions throughout the complex ion-containing solution; fractionally precipitating lithium values from said substantially homogeneous solution; and maintaining substantially homogeneous conditions throughout said fractional precipitation by maintaining a maximum rate of change of environmental conditions of 0.1° C. per minute for temperature, 0.1 pH unit per hour for pH and 1 relative percent per hour for ion concentration.

9. A process in accordance with claim 8 wherein a salt selected from the group consisting of ammonium carbonate and ammonium phosphate is employed as the fractionally precipitating agent.

References Cited in the file of this patent

UNITED STATES PATENTS

| | | |
|---|---|---|
| 2,204,072 | Dean | June 11, 1940 |
| 2,780,526 | Fleck | Feb. 5, 1957 |

OTHER REFERENCES

Perret et al.: Proceedings of the Second United Nations International Conference on the Peaceful Uses of Atomic Energy, vol. 4, pp. 595–601, September 1–13, 1958, United Nations, New York.

Rodden: "Analytical Chemistry of the Manhattan Project" (1950), page 6, McGraw-Hill Book Company, Inc., New York.